(12) United States Patent
Yamanaka et al.

(10) Patent No.: US 9,466,936 B2
(45) Date of Patent: Oct. 11, 2016

(54) BULB SOCKET AND LIGHTING SYSTEM

(71) Applicant: Yazaki Corporation, Tokyo (JP)

(72) Inventors: Hideki Yamanaka, Makinohara (JP);
Atsuro Murata, Makinohara (JP);
Ryohei Ochiai, Fujieda (JP)

(73) Assignee: Yazaki Corporation, Tokyo (JP)

( * ) Notice: Subject to any disclaimer, the term of this patent is extended or adjusted under 35 U.S.C. 154(b) by 3 days.

(21) Appl. No.: 14/338,715

(22) Filed: Jul. 23, 2014

(65) Prior Publication Data

US 2014/0334183 A1    Nov. 13, 2014

Related U.S. Application Data

(63) Continuation of application No. PCT/JP2013/000314, filed on Jan. 23, 2013.

(30) Foreign Application Priority Data

Jan. 26, 2012   (JP) .................................. 2012-013940

(51) Int. Cl.
*H01R 33/00* (2006.01)
*H01R 33/09* (2006.01)
(Continued)

(52) U.S. Cl.
CPC ............ *H01R 33/09* (2013.01); *B60Q 3/0279* (2013.01); *F21V 19/0005* (2013.01); *F21V 23/06* (2013.01)

(58) Field of Classification Search
CPC .... F21V 23/06; F21V 19/0005; H01R 33/09
USPC ........................................ 362/640, 649, 657
See application file for complete search history.

(56) References Cited

U.S. PATENT DOCUMENTS 4,940,422 A    7/1990   Forish et al.
5,709,571 A    1/1998   Briski et al.
(Continued)

FOREIGN PATENT DOCUMENTS

EP       0023717 A1    2/1981
JP    2009516896 A    4/2009
(Continued)

OTHER PUBLICATIONS

International Search Report and Written Opinion dated Apr. 11, 2013, issued for PCT/JP2013/000314.
(Continued)

*Primary Examiner* — Andrew Coughlin
*Assistant Examiner* — Meghan Ulanday
(74) *Attorney, Agent, or Firm* — Locke Lord LLP; James E. Armstrong, IV; Brian S. Matross (57) ABSTRACT

A bulb socket and a lighting system, which can reduce components and dimensions and improve a force for holding a bulb, are provided. A housing has an insertion hole including an opening for receiving a base portion of a bulb, and a plurality of projection portions projecting from a deep side wall of the insertion hole toward an opening side. The projection portions are opposed to each other so that the base portion is sandwiched therebetween. A distance between the projection portions is formed smaller than a cross-sectional dimension of the base portion. When the base portion is inserted into the insertion hole, the projection portions are elastically deformed away from each other, and contacts slidingly a surface of the base portion. The base portion is sandwiched by a biasing force of the elastically deformed projection portions in a biasing state, and thereby the bulb is held.

4 Claims, 7 Drawing Sheets

(51) Int. Cl.
   *B60Q 3/02*    (2006.01)
   *F21V 19/00*   (2006.01)
   *F21V 23/06*   (2006.01)

(56) References Cited

U.S. PATENT DOCUMENTS

| | | |
|---|---|---|
| 5,865,647 A | 2/1999 | Garber et al. |
| 5,951,318 A | 9/1999 | Harada |
| 7,604,386 B2 | 10/2009 | Rawlings et al. |
| 8,262,266 B2 | 9/2012 | Ohtsuka et al. |
| 2009/0073707 A1 | 3/2009 | Nagai et al. |
| 2009/0191766 A1 | 7/2009 | Nagai et al. |

FOREIGN PATENT DOCUMENTS

| | | |
|---|---|---|
| JP | 2009-173163 A | 8/2009 |
| JP | 2010188849 A | 9/2010 |

OTHER PUBLICATIONS

Notification of Reasons for Refusal, issued in corresponding Korean Patent Application No. KR 10-2014-7021552, dated Oct. 21, 2015.
Notification of Reasons for Refusal, issued in corresponding Japanese Patent Application No. JP 2012-013940, dated Dec. 15, 2015.

BULB SOCKET AND LIGHTING SYSTEM

CROSS REFERENCE TO RELATED APPLICATIONS

This application is related to co-pending application: "BULB SOCKET AND LIGHTING SYSTEM" filed even date herewith in the names of Hideki Yamanaka, Atsuro Murata and Ryohei Konishi as a national phase entry of PCT/JP2013/000315, which application is assigned to the assignee of the present application and is incorporated by reference herein.

TECHNICAL FIELD

The present invention relates to a bulb socket for holding a bulb, and a lighting system.

BACKGROUND ART

Figure 8:
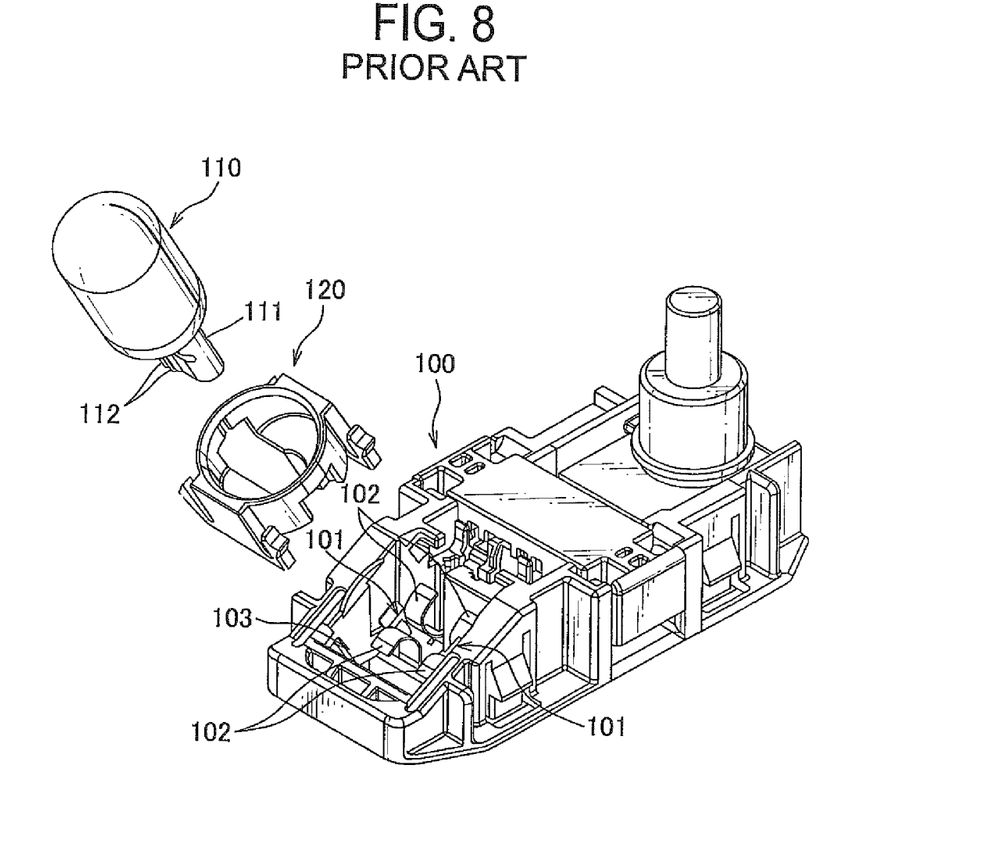
FIG. 8 is an exploded perspective view showing a conventional lighting system.

The PTL 1 discloses a bulb socket structure that in an indoor lighting system mounted in a vehicle and arranged in a ceiling of the vehicle such as an automobile, for example, a plastic socket main body for fixing a bulb such as a wedge base bulb and a pair of feed terminals (terminal) arranged in the socket main body are provided. A base portion of the bulb is inserted into a fixing hole of the socket main body, and the base portion is sandwiched by the pair of the feed terminals. In the bulb socket structure as described in the PTL 1, as shown in FIG. 8, the pair of the feed terminals 101 has a pair of sandwiching pieces 102 for sandwiching the base portion 111 of the bulb 110. The pair of the sandwiching pieces 102 is elastically deformed by inserting the base portion 111 between the sandwiching pieces 102 in a direction away from each other, and thereby the base portion 111 is sandwiched by a biasing force associated with this deformation. Furthermore, in the fixing hole 103 of the socket 100, a spacer 120 is arranged. By the spacer 120, the base portion 111 of the bulb 110 is guided, and movement of the held bulb 110 is controlled. As a result, the bulb 110 can be steady hold in the socket 100.

CITATION LIST

Patent Literature

PTL 1
Japanese Patent Application No. 2009-173163

SUMMARY OF INVENTION

Technical Problem

The conventional bulb socket disclosed in the PTL 1 guides the bulb 110 by using the spacer 120 and controls the movement of the bulb 110. For this reason, the spacer 120 being a component different from the socket 100 is required, and thereby components are increased. Furthermore, since the spacer 120 is inserted into the fixing hole 103 of the socket 100 and fixed, the size of the socket 100 becomes large. When the spacer 120 projects from the socket 100, the whole of the bulb socket and lighting system becomes further large.

Accordingly, an object of the present invention is to provide a bulb socket and a lighting system which can reduce components and size thereof, and can improve holding force.

Solution to Problem

In order to attain the above object, according to a first aspect, a bulb socket for holding a bulb includes a light-emitting portion and a base portion. The bulb socket comprises a socket main body receiving and holding the base portion of the bulb; and a terminal arranged in the socket main body and electrically connected to the base portion. The socket main body has an insertion hole including an opening for receiving the base portion, and at lease a pair of projection portions projecting from a deep side wall of the insertion hole toward the opening. The pair of projection portions is opposed to each other so that the base portion is sandwiched therebetween, and a distance between the projection portions is formed smaller than a cross-sectional dimension of the base portion. When the base portion is inserted into the insertion hole, the pair of projection portions is elastically deformed to be away from each other, and contacts slidingly a surface of the base portion.

Preferably, according to a second aspect, in the bulb socket of the first aspect, the four projection portions as the at least pair of the projection portions are arranged along a terminal portion of the terminal connected to the base portion, and located in a line-symmetric position with respect to a central axis of the bulb socket along an insertion direction of the bulb.

Preferably, according to a third aspect, in the bulb socket of the first or second aspect, the base portion of the bulb is formed by a cylinder portion centering on the central axis along the insertion direction of the bulb, and a pair of flat plate portions extending from the cylinder portion in a radial direction opposed to each other. Furthermore, the projection portion is formed with a U-shaped cross-sectional curved-surface portion contacting slidingly the cylinder portion, and a corner portion continued to an edge of the curved-surface portion and contacting slidingly the flat plate portion.

Preferably, according to a fourth aspect, a lighting system comprises the bulb socket described in any one of first to third aspects; a bulb held in the bulb socket; a protection cover for covering the bulb socket and the bulb; and a transmission lens fixed to the bulb socket and the protection cover, and transmitting light from a light-emitting portion of the bulb.

Advantageous Effects of Invention

According to the present invention of the first aspect, the distance between the projection portions is formed smaller than the cross-sectional dimension of the base portion, and the pair of projection portions elastically deformed to be away from each other projects from the deep side wall of the insertion hole toward the opening side. As a result, by inserting the base portion between the projection portions, the base portion is sandwiched by a biasing force of the elastically deformed projection portions, and thereby the bulb can be held. Thus, the bulb can be held without use of a spacer being another component. Therefore, components can be reduced, and dimension of the bulb socket can be decreased. Furthermore, by holding the base portion of the bulb with the projection portions, electrically connection between the base portion and the terminal can be maintained, and deformation of the terminal can be prevented.

According to the present invention of the second aspect, since the projections are arranged along the terminal portion of the terminal, movement of the base portion can be controlled near the terminal portion, and relative displacement can be steadily suppressed. Moreover, since the four projection portions are located in a line-symmetric position with respect to the central axis of the bulb, movement of the base portion along a direction crossing to the insertion direction and a circumferential direction of the central axis can be controlled by the four projection portions.

According to the present invention of the third aspect, when the bulb having the base portion including the cylinder portion and the pair of flat plate portions is used, the projection portion is formed with the curved-surface portion contacting slidingly the cylinder portion and the corner portion contacting slidingly the flat plate portion. Thus, the base portion can be smoothly guided and steadily held by the projection portions. More specifically, since the curved-surface portion can contact slidingly the cylinder portion, the base portion can be guided moving the central axis to a predetermined position of the insertion hole, and the corner portion can contact slidingly the flat plat portion. Therefore, movement of the base portion can be steadily controlled.

According to the present invention of the fourth aspect, in common with the above bulb socket, components and the dimension of the bulb socket can be reduced in the lighting system. Furthermore, since the base portion is sandwiched with the projection portions and the bulb can be held, movement and coming off of the bulb can be prevented. Further, since electrically connection between the terminal and the bulb can be maintained well, occurrence of bad lighting can be avoided. In addition, since the bulb socket holding the bulb is covered with the protection cover, external force can not act on the bulb, and a holding state of the bulb can be maintained better.

DESCRIPTION OF EMBODIMENTS

Figure 1:
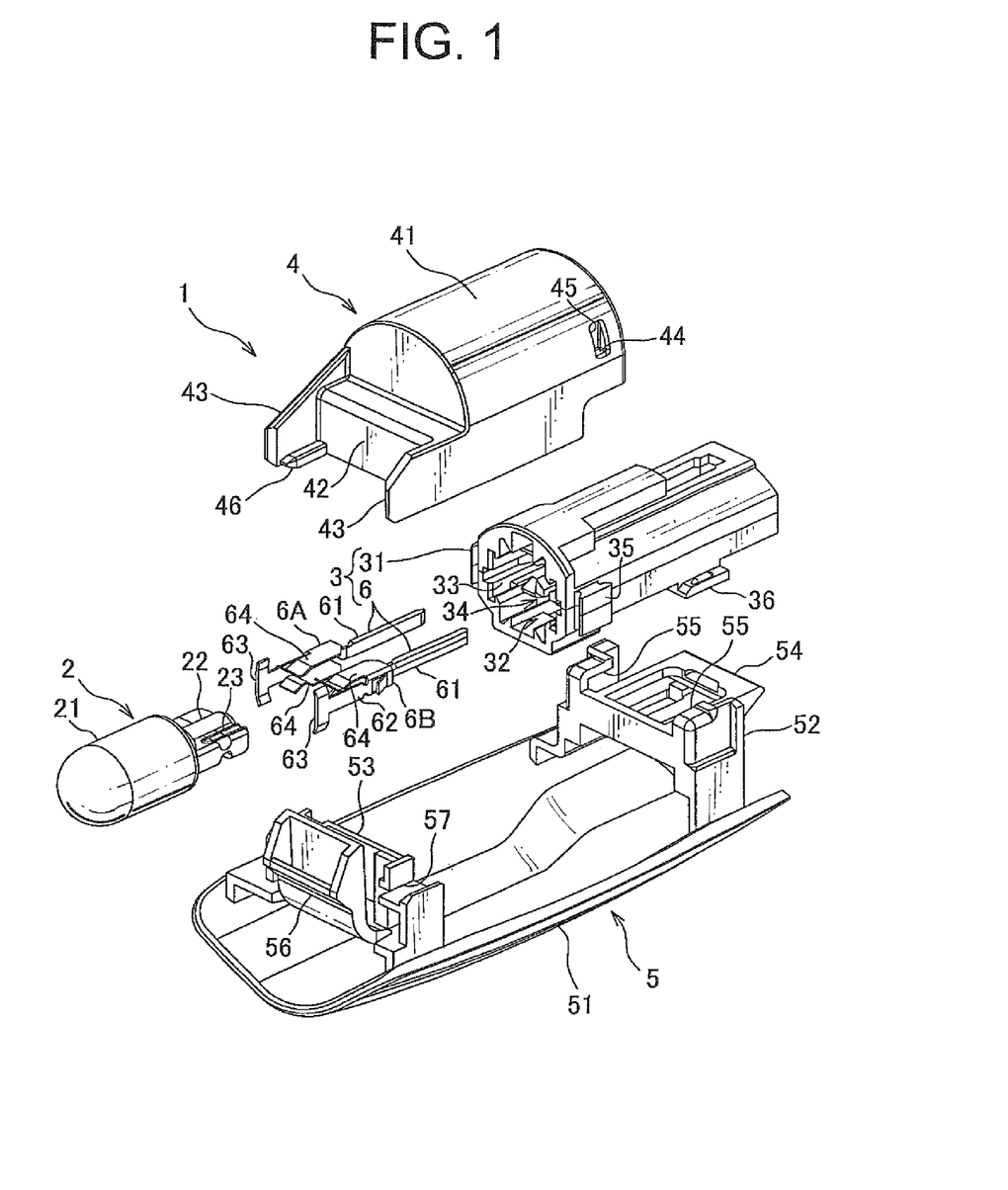
FIG. 1 is an exploded perspective view showing a lighting system according to an embodiment of the present invention.

A lighting system according to an embodiment of the present invention will be explained with reference to FIGS. 1 to 7. The lighting system 1 of the present invention is a room lighting device attached to a roof or door trim located in a surface of a vehicle occupant room of a vehicle. In particular, the lighting system 1 is suitable for use in a door courtesy lamp arranged in the door trim. As shown in FIG. 1, the lighting system 1 has a bulb (a light bulb) 2, a bulb socket 3 for holding the bulb 2, a protection cover 4 for covering the bulb 2 and the bulb socket 3, and transmission lens 5 fixed in the bulb socket 3 and the protection cover 4 and transmitting a light illuminated from the bulb 2.

Figure 2:
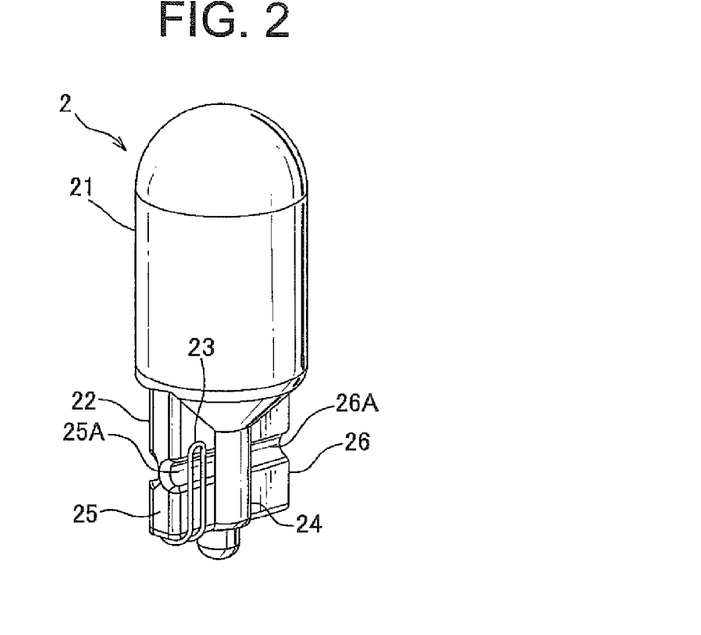
FIG. 2 is a perspective view showing a bulb used for the lighting system.
Figure 3:
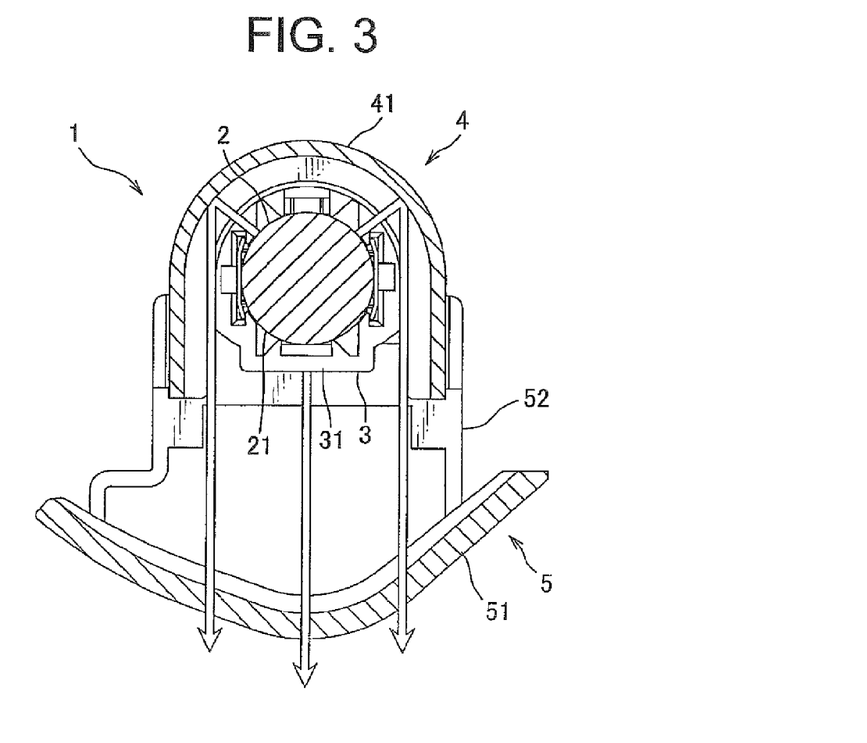
FIG. 3 is a sectional-view showing an assembling state of the lighting system.

As shown in FIGS. 2 and 3, the bulb 2 is a wedge base bulb having a light-emitting portion 21 including a filament inside, a base portion 22 functioning as a bayonet cap and extending in an axis direction of the light-emitting portion 21, and a pair of contact leads 23 arranged along a side surface of the base portion 22. The base portion 22 is a resin component having insulation performance, and has a cylinder portion 24 extending from the center of the end of the light-emitting portion 21, and a pair of flat plate portions 25, 26 extending from the cylinder portion 24 in a radial direction away from each other. The cylinder portion 24 extends along in as insertion direction of the bulb 2 against the bulb socket 3, and the base portion 22 is located in a line-symmetric position against the central axis of the cylinder portion 24 along the insertion direction. Furthermore, at an intermediate position of each the flat plate portion 25, 26 in the insertion direction, U-shaped grooves 25A and 26B are formed.

The contact lead 23 is a conductive wire rod consisting of copper wire connected to the filament of the light-emitting portion 21. One contact lead 23 consists of a positive electrode or negative electrode of the bulb 2, and the other contact lead 23 consists of a positive electrode or negative electrode of the bulb 2. The pair of contact leads 23 projects from a tip surface of the flat plate portions 25, 26 in the insertion direction, respectively. One contact lead 23 extends along a side surface of the flat plate portion 25 toward the light-emitting portion 21 in the insertion direction, and the other contact lead 23 extends along a side surface of the flat plate portion 26 toward the light-emitting portion 21 in the insertion direction. Furthermore, the contact leads 23 are attached to each surface of the side surfaces.

As shown in FIG. 1, the bulb socket 3 has a housing 31 being a socket main body including an insertion hole 32 receiving the base portion 22 of the bulb 2, and a bus bar 6 (first bus bar 6A and second bus bar 6B) as a pair of terminals arranged in the housing 31 and electrically connected with the contact leads 23 of the bulb 2. The housing 31 is an integral molding component made of resin including insulation performance, and formed in a tubular shape. In the insertion hole 32, a terminal holding portion 33 for holding the terminal 6, and a bulb guiding portion 34 for guiding the cylinder portion 24 of the bulb 2 in the insertion direction are formed. In an outer surface of the housing 31, a cover locking portion 35 for locking the protection cover 4, and a lens locking portion 36 for locking the transmission lens 5 are formed. The housing 31 is provided with an electric wire (not shown) through the protection cover 4, the electric wire is connected to the bus bar 6 in the housing 31, and thereby electric power is supplied to the bulb 2.

The bus bar 6 is formed by punching or bending a conductive metal plate, and has a fixed portion 61 fixed in the housing 31 and connected to the electric wire, an extension portion 62 extending from the fixed portion 61, a widening portion 63 widening in the tip of the extension portion 62, and a pair of terminal portions 64 bending from the middle of the extension portion 62 and connected. Also, in the embodiment of the present invention, the first bus bar 6A and the second bus bar 6B are formed in the same shape, and opposed to each other. That is, the first bus bar 6A and the second bus bar 6B are installed in the housing 31 so that the first and second bus bars 6A, 6B are symmetric about the central axis (corresponding to the central axis of the bulb 2) of the insertion hole 32.

The pair of terminal portions 64 extends from a position bending from the extension portion 62 toward an opening side of the insertion hole 32, and is formed in a cantilever-shape. Furthermore, the terminal portions 64 have respectively a contact point arranged in the end side thereof and bent in a curve surface shape. When the base portion 22 of the bulb 2 is inserted into the insertion hole 32, the terminal portions 64 are elastically deformed to be away from each other, the contact point of the one terminal portion 64 abuts on the contact lead 23 of the bulb 2, and the contact point of the other terminal portion 64 abuts on side surfaces of the flat plate portions 25, 26 of the base portion 22. In this manner, by sandwiching the base portion 22 between the pair of the terminal portions 64, the bulb 2 is held.

The protection cover 4 is an integral molding component made of resin including insulation performance, and has a cover main body 41 formed in a half cylinder shape, an end face portion 42, and a pair of flanges 43 projecting over the end face portion 42. The end face portion 42 is arranged at one end of the cover main body 41, and covers the light-emitting portion 21 of the bulb 2 attached to the bulb socket 3. Inside of the cover main body 41, a reflecting surface reflecting light which is emitted from the light-emitting portion 21 of the bulb 2 toward the transmission lens 5 is arranged, and a locked portion 44 locked into the cover locking portion 35 of the bulb socket 3 is formed. When the locked portion 44 pushes the protection cover 4 toward the bulb socket 3 from top to bottom in FIG. 1, the locked portion 44 is able to be locked into the cover locking portion 35. Also, the locked portion 44 is able to be released by an operation from a penetration portion 45 arranged in a side surface of the cover main body 41. Furthermore, in the pair of the flanges 43, lens engaging portions 46 are formed so as to be engaged with the transmission lens, respectively.

The transmission lens 5 has a lens main body 51, a first attaching portion 52, and a second attaching portion 53. The lens main body 51 is made of transparent or translucent resin, and formed in a suitable curved-plate shape. The first and second attaching portions 52, 53 project from an inner surface of the lens main body 51. Furthermore, the first attaching portion 52 has a locking piece 54 projecting along back end of the bulb socket 3 outward, and a pair of first engaging portions 55 engaged with the lens engaging portion 36 of the bulb socket 3. The second attaching portion 53 has a lock portion 56 engaged with interior member of the vehicle (not shown), and a pair of second engaging portions 57 engaged with the lens engaging portion 46 of the protection cover 4.

The above lighting system 1 is fixed to interior member of the vehicle as below. First, for the bulb socket 3 attaching the bus bar 6 to the housing 31, the base portion 22 is inserted into the insertion hole 32, and thereby the bulb 2 is held. The locked portion 44 of the protection cover 4 is locked into the cover locking portion 35 of the bulb socket 3, and functional section is constructed by combining the bulb 2, the bulb socket 3 and the protection cover 4. Next, the lens engaging portions 36, 46 of the bulb socket 3 and the protection cover 4 are slid and engaged with the first and second engaging portions 55, 57 of the transmission lens. As a result, as shown in FIG. 3, the lighting system 1 attaching the transmission lens to the functional section is assembled. In this manner, after assembling the lighting system 1, the lighting system 1 is inserted into a hollow arranged in the interior member from the protection cover 4, the locking piece 54 of the transmission lens 5 is locked into an attaching portion of the interior member, and the lock portion 56 is engaged with the interior member. Thereby, a process for attaching the lighting system 1 to the vehicle is completed.

Figure 4:
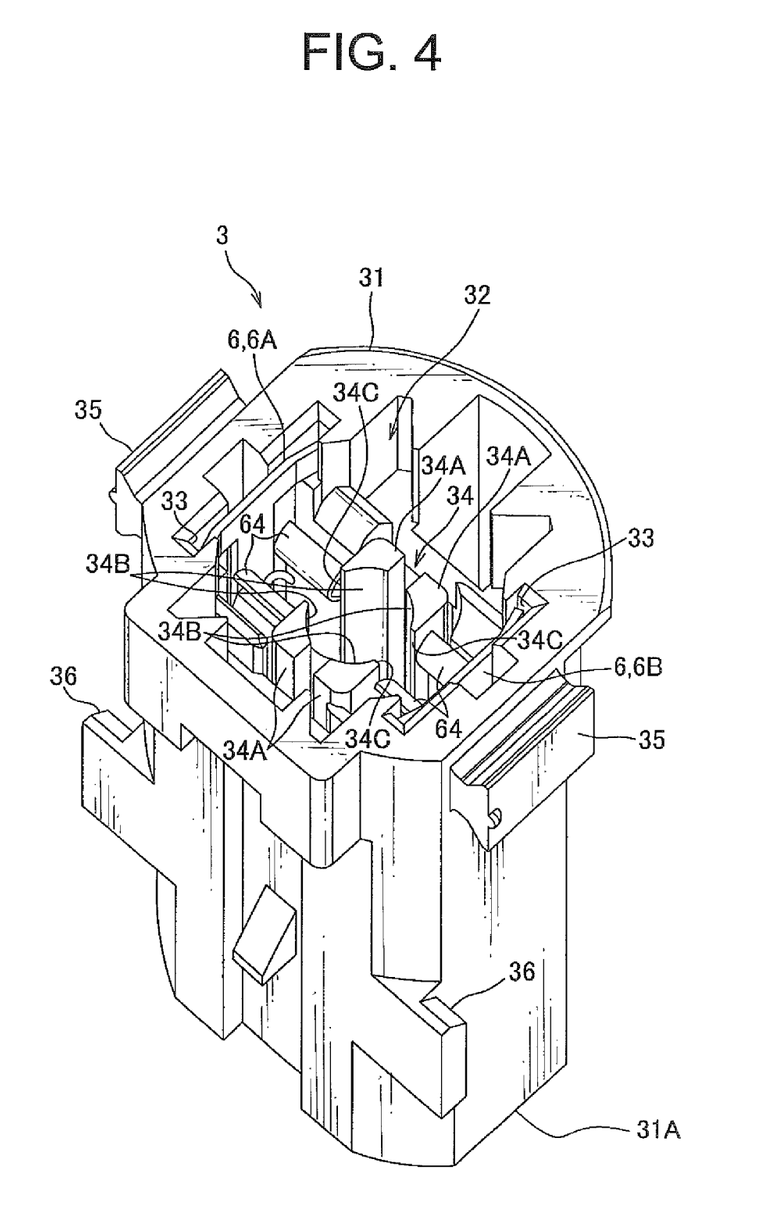
FIG. 4 is a perspective view showing a bulb socket of the lighting system.
Figure 5A:
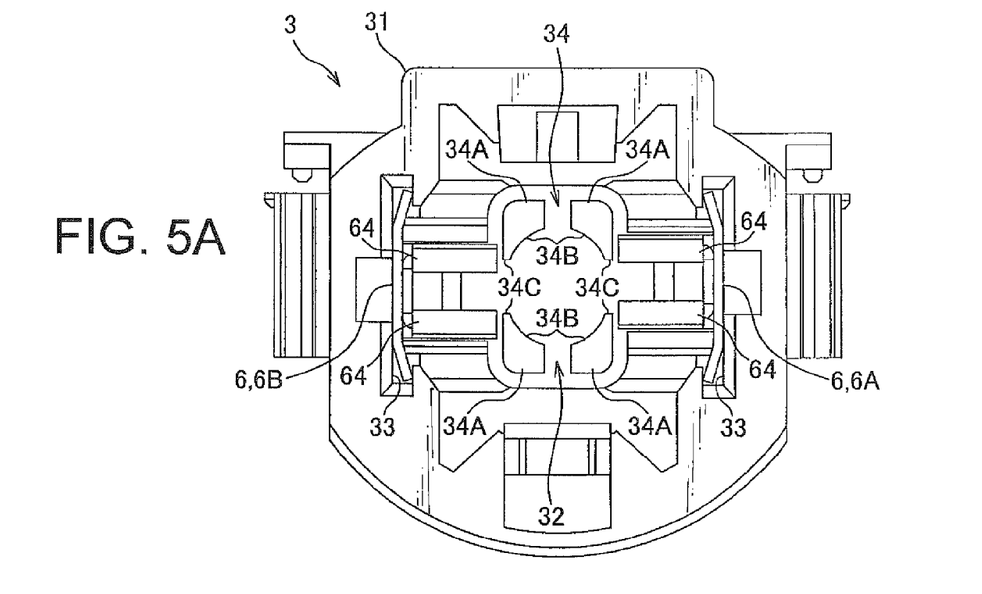
FIG. 5A is a front view showing the bulb socket.
Figure 5B:
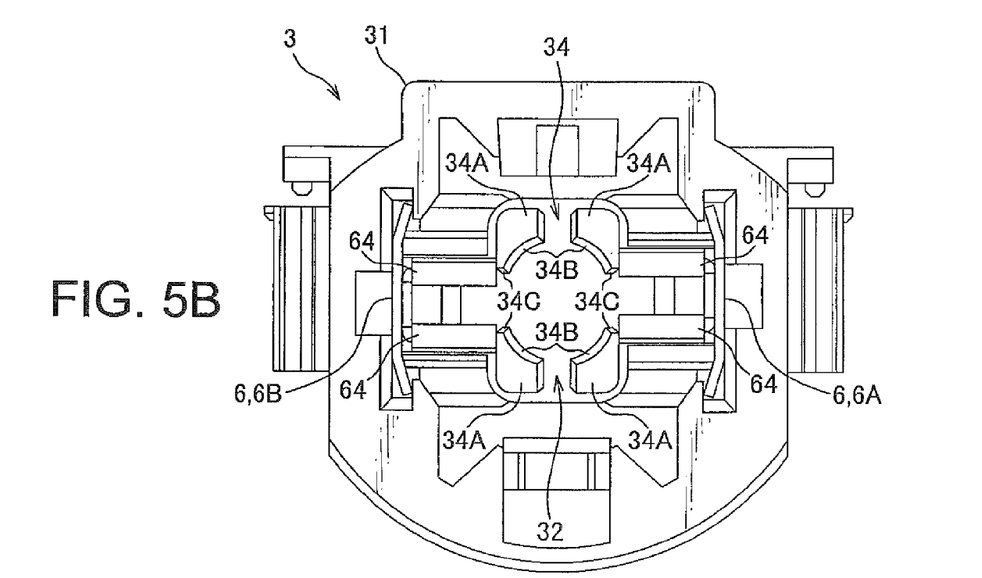
FIG. 5B is a front view showing the bulb socket.
Figure 6A:
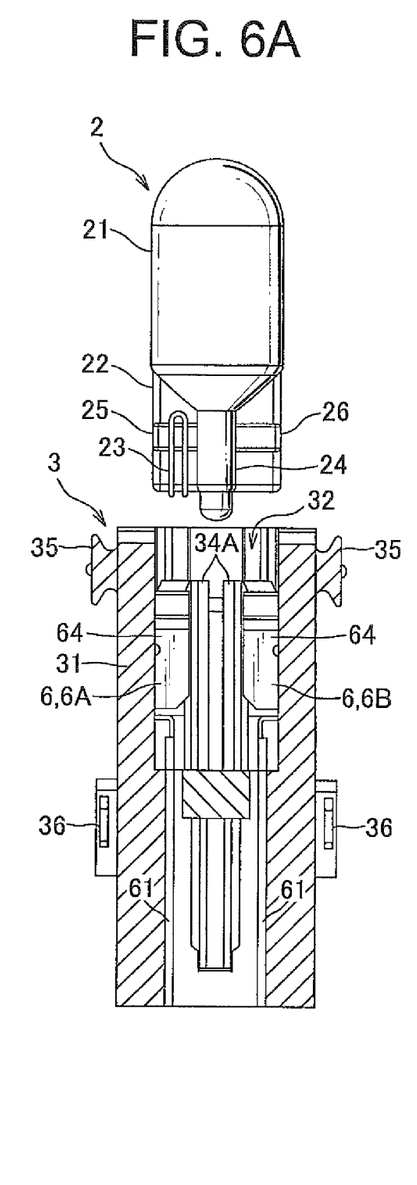
FIG. 6A is a sectional-view showing an attaching process for attaching the bulb to the bulb socket.
Figure 6B:
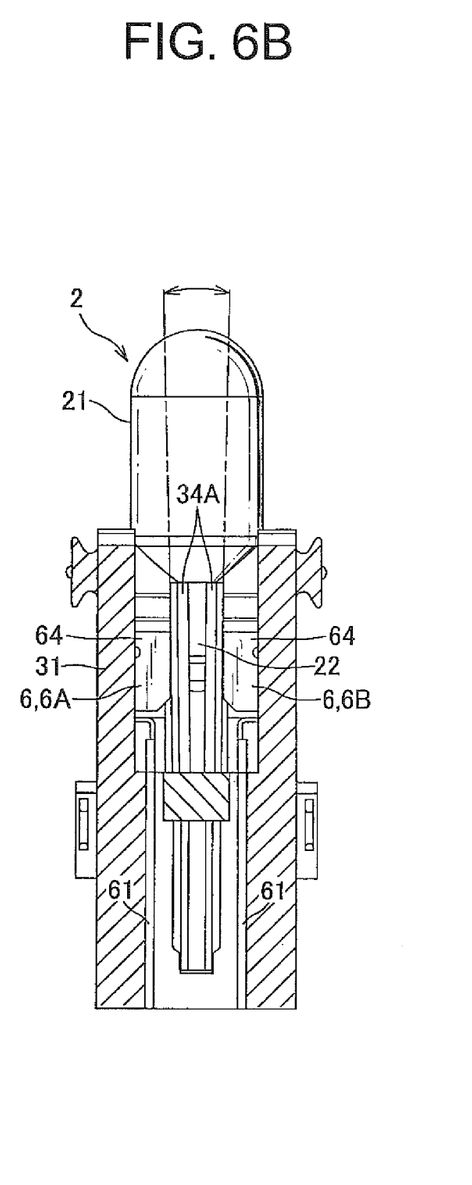
FIG. 6B is a sectional-view showing an attaching process for attaching the bulb to the bulb socket.

Next, construction and action of the bulb guiding portion 34 in the housing 31 will be explained with reference to FIGS. 4 to 7. As shown in FIGS. 4 to 6, the bulb guiding portion 34 has four projection portions 34A projecting from a deep side wall 31A toward an opening side of the insertion hole 32 and formed in a cantilever shape. The four projection portions 34A are arranged so that each a pair of two projection portions 34A is located in a line-symmetric position across the base portion 22 of the bulb 2 inserted into the insertion hole 32. More specifically, the pair of projection portions 34A is located next to the first bus bar 6A of a right side of FIG. 5, and the pair of projection portions 34A is located next to the second bus bar 6B of a left side of FIG. 5. Furthermore, the four projection portions 34A are positioned in a line-symmetric position with respect to the central axis of the base portion 22 (central axis of the cylinder portion 24).

Each projection portion 34A includes a curved-surface portion 34B and a corner portion 34C. The curved-surface portion 34B is slidably arranged against the cylinder portion 24 of the base portion 22, and is formed in U-shaped cross-sectional shape. The corner portion 34C is continued to an edge of the curved-surface portion 34B, and slidably arranged against the flat plate portion 25. As shown in FIGS. 5A and 6A, in a natural state the above projection portion 34A extends from the deep side wall 31A toward the opening side of the insertion hole 32 parallel to the insertion direction of the bulb 2. On the other hand, as shown in FIGS. 5B and 6B, in a biasing state, according to the insertion of the bulb 2 the tips of the above projection portions 34A are opened in a direction away from each other. That is, the projection portions 34A are elastically deformed between the natural state and the biasing state. In the natural state, the circular inner diameter of the curved-surface portion 34B in each projection portion 34A is slightly formed smaller than the outer diameter of the cylinder portion 24 in the base portion 22, and a distance between the corner portions 34C in the pair of projection portions 34A is slightly formed smaller than the thickness-dimension of the flat plate portion 25 in the base portion 22.

Figure 7A:
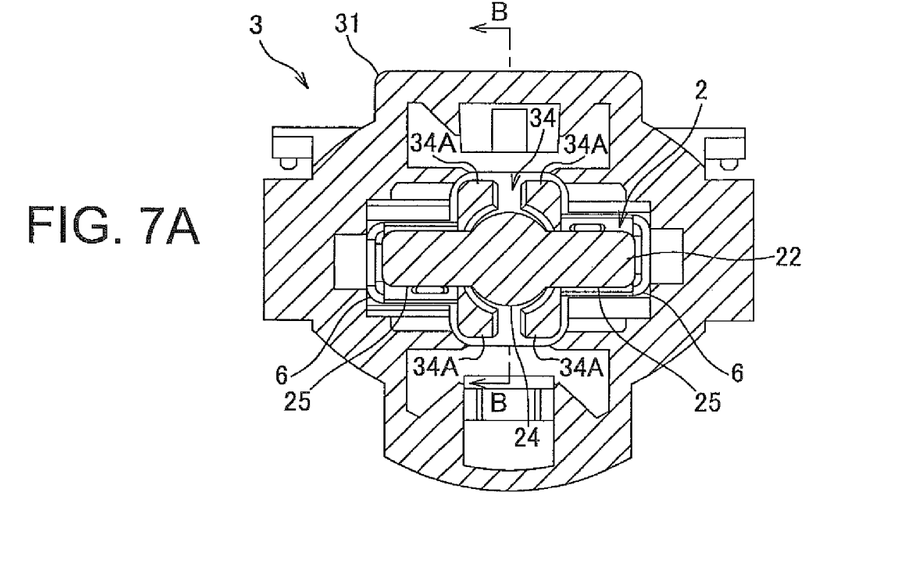
FIG. 7A is an enlarged sectional-view showing the attaching state of the bulb in detail.
Figure 7B:
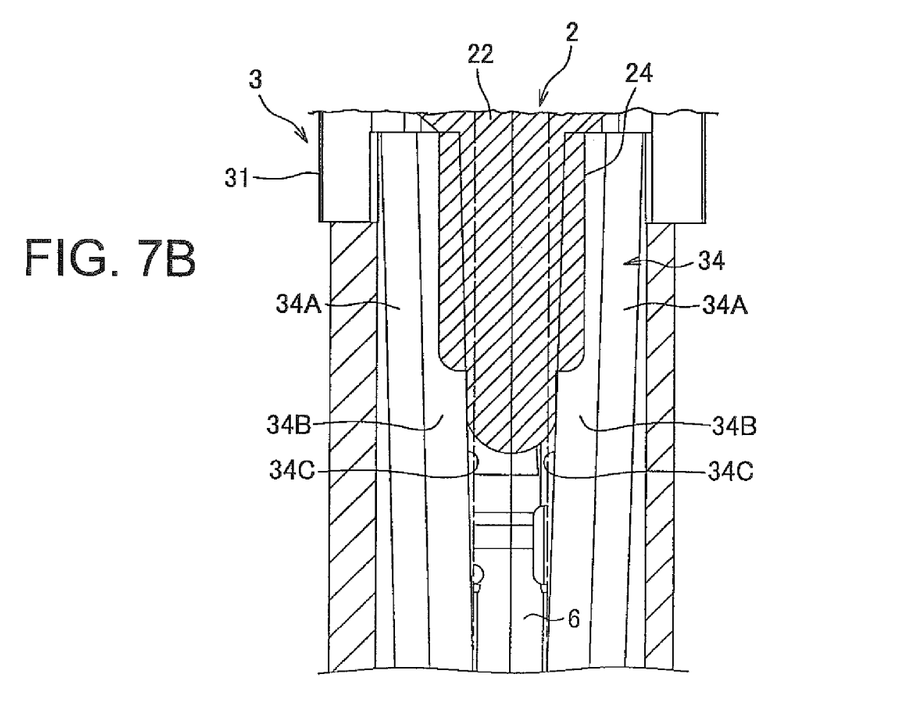
FIG. 7B is an enlarged sectional-view showing the attaching state of the bulb in detail.

In a case that the base portion 22 of the bulb 2 is inserted into the bulb guiding portion 34, first the end of the cylinder portion 24 is positioned and guided inside of the four curved-surface portions 34B, each projection portion 34A is elastically deformed in a direction expanding the end of the projection portion 34A by further pressing the bulb 2, and thereby the corner portion 34C contacts slidingly a corner between the cylinder portion 24 and the flat plate portion 25. In addition, when the base portion 22 is further inserted into a deep side of the insertion hole 32, each projection portion 34A is further elastically deformed. Furthermore, as shown in FIG. 7 the curved-surface portion 34B contacts slidingly the tip of the cylinder portion 24, and the corner portion 34C contacts slidingly the surface of the flat plate portion 25. In such state that the corner portion 34C contacts slidingly the surface of the flat plate portion 25 when the bulb 2 is inserted to a position sandwiched between the terminal portions 64, the base portion 22 is sandwiched by a biasing force of the deformed projection portion 34A in the biasing state, and thereby the base portion 22 of the bulb 2 is held by the bulb guiding portion 34.

According to the embodiment of the present invention, the base portion 22 of the bulb 2 is inserted between the projection portions 34A of the bulb guiding portion 34, and the base portion 22 is held by the biasing force of the deformed projection portion 34A. As a result, the bulb 2 can be held. Thus, the bulb 2 can be held without the use of a spacer being another part. Furthermore, the number of components can be reduced, and the size of the bulb socket can be reduced. Furthermore, since the base portion 22 of the bulb 22 is held by the projection portion 34A, electrically connection between the contact lead 23 and the terminal portion 64 of the bus bar 64 can be satisfactory maintained, and excessive deformation of the terminal portion 64 can be controlled. Moreover, in the lighting system 1, since backlash and coming off of the bulb 2 can be prevented, and electrically connection between the bus bar 6 and the bulb 2 can be maintained, lighting failure of the bulb 2 can be avoided. Additionally, since the bulb socket 3 holding the bulb 2 is covered with the protection cover 4, the bulb 2 is not subjected to external force, and thereby excessive stress on the terminal portion 64 can be controlled.

The illustrated embodiments of the present invention have been described for illustrative purposes only, and not by way of limiting the invention. Accordingly, the present invention can be implemented with various modifications made thereto within the scope of the present invention.

For example, the lighting system 1 fixed to the vehicle of the automobile is explained in the above embodiment; however it is not limited thereto. The lighting system may be arranged in a structural object such as buildings. Furthermore, the lighting system 1 of the embodiment is constructed as having the bulb socket 3 holding the bulb 2, the protection cover 4 and the transmission lens 5; however the protection cover 4 and the transmission lens 5 are not essential. Thus, they can be omitted as appropriate, and the lighting system may have a member excluding the protection cover 4 and the transmission lens 5. Additionally, in the present invention, the wedge base bulb is used as the bulb 2; however it is not limited thereto. For example, various electric bulbs including a contact point at an arbitrary position can be used. Furthermore, the lighting system of the present invention has the filament in light-emitting portion of the bulb, such as an incandescent lamp, halogen lamp or mercury lamp; however it is not limited thereto. Any objects such as Fluorescent lamp or LED lamp can be used.

REFERENCE SIGNS LIST 1 lighting system
2 bulb
3 bulb socket
4 protection cover
5 transmission lens
6 bus bar (terminal)
21 light-emitting portion
22 base portion
24 cylinder portion
25, 26 flat plate portion
31 housing (socket main body)
32 insertion hole
34A projection portion
34B curved-surface portion
34C corner portion
64 terminal portion

The invention claimed is:

1. A bulb socket for holding a bulb including a light-emitting portion and a base portion formed by a cylinder portion centering on a central axis along an insertion direction of the bulb, and a pair of flat plate portions extending from the cylinder portion in a radial direction opposed to each other, the bulb socket comprising:
   a socket main body for receiving and holding the base portion of the bulb; and
   a terminal arranged in the socket main body and electrically connected to the base portion,
      wherein the socket main body has an insertion hole including an opening for receiving the base portion, and a plurality of projection portions projecting from a deep side wall of the insertion hole toward the opening, and defining a cylindrical space configured to receive the cylinder portion of the base portion of the bulb,
      wherein a pair of the plurality of projection portions are opposed to one another so that the base portion is sandwiched therebetween, and a distance between the pair of projection portions is formed smaller than a cross-sectional dimension of the base portion,
      wherein the projection portions are able to slidingly contact the cylinder portion,
      wherein when the base portion is inserted into the insertion hole, the pair of projection portions are elastically deformed to be away from each other, and contacts slidingly a surface of the base portion, and
      wherein each projection portion is formed with a U-shaped cross-sectional curved-surface portion configured to slidingly contact the cylinder portion, and a corner portion continued to an edge of the curved-surface portion and contacting slidingly the flat plate portion.

2. The bulb socket as claimed in claim 1, wherein the plurality of projection portions includes four projection portions, and the pair of the projection portions are arranged along a terminal portion of the terminal connected to the base portion, and located in a line-symmetric position with respect to a central axis of the bulb socket along an insertion direction of the bulb.

3. A lighting system comprising:
   the bulb socket described in claim 2;
   a bulb held in the bulb socket;
   a protection cover for covering the bulb socket and the bulb; and
   a transmission lens fixed to the bulb socket and the protection cover, and transmitting light from a light-emitting portion of the bulb.

4. A lighting system comprising:
   the bulb socket described in claim 1;
   a bulb held in the bulb socket;
   a protection cover for covering the bulb socket and the bulb; and
   a transmission lens fixed to the bulb socket and the protection cover, and transmitting light from a light-emitting portion of the bulb.

* * * * *